United States Patent [19]

Coe, Jr.

[11] 4,400,662
[45] Aug. 23, 1983

[54] METHOD AND APPARATUS FOR ENERGIZING AN ELECTROSTATIC PRECIPITATOR

[75] Inventor: E. Lee Coe, Jr., Downey, Calif.
[73] Assignee: Wahlco, Inc., Santa Ana, Calif.
[21] Appl. No.: 317,793
[22] Filed: Nov. 4, 1981
[51] Int. Cl.³ .................... B03C 3/02; G05B 24/02
[52] U.S. Cl. .................... 323/320; 323/903; 363/124; 55/139
[58] Field of Search ............... 323/222–225, 323/320, 325, 326, 350–351, 903; 363/124; 55/105, 139

[56] References Cited

U.S. PATENT DOCUMENTS

| | | | |
|---|---|---|---|
| 3,577,708 | 5/1971 | Drenning et al. | 323/903 X |
| 3,648,437 | 3/1972 | Bridges | 323/903 X |
| 3,763,418 | 10/1973 | Beck et al. | 363/124 |
| 4,135,236 | 1/1979 | Mann et al. | 363/124 |

Primary Examiner—William M. Shoop
Assistant Examiner—Peter S. Wong
Attorney, Agent, or Firm—Howard E. Sandler

[57] ABSTRACT

A method and apparatus for providing a pulse-generating control to energize the electrodes of an electrostatic precipitator which includes means for producing a voltage between the electrodes of the precipitator after a voltage pulse has been applied to the precipitator electrodes which is higher than the voltage existing between the electrodes prior to the application of the voltage pulse and which voltage pulses are repeated until a preselected voltage is achieved between the electrodes.

12 Claims, 3 Drawing Figures

METHOD AND APPARATUS FOR ENERGIZING AN ELECTROSTATIC PRECIPITATOR

It is well known that energizing single state electrostatic precipitators with short time duration high energy pulses is advantageous—see for example U.S. Pat. No. 4,052,177; "Present Status of the Research-Cottrell Pulse Energization System" paper 80-32.3, Air Pollution Control Association Annual Meeting, Montreal, Quebec, Canada, June 1980; and "Precipitator Energization Utilizing an Energy Conserving Pulse Generator" paper presented at the Second Symposium on the Transfer and Utilization of Particulate Control Technology, Denver, Colorado, July 1979. Such prior pulse energization systems have utilized two separate and essentially independent sets of control components for supplying power to the precipitator, i.e., one set for supplying a DC bias voltage to the precipitator and one set for supplying a voltage pulse superimposed on the DC bias voltage.

It has also been recognized in the prior art that in a pulse energization system for an electrical precipitator the natural circuit behavior may produce pulses ending at higher than starting voltages between the electrodes. In such systems additions were made to the pulse circuit to prevent such higher than starting voltages—see "Novel Electrode Construction for Pulse Charging" EPA-600/7-79-044a, February, 1979, Vol. I, page 245.

Resonant pulse generators have also been utilized in other pulsed power applications, such as radar equipment; however, such generators are not satisfactory for energizing a precipitator effectively since they do not provide for maintaining a voltage on the precipitator during the interpulse interval of a value at least equal to the corona threshold value. The corona threshold value being known as the voltage applied to the electrodes of a precipitator which must be exceeded to permit current flow between the electrodes and which value is known to vary as the precipitator operating conditions vary.

The pulse generator system of this invention provides a succession of pulses to the electrodes of an electrostatic precipitator which insures that the interelectrode voltage at the end of each pulse is higher than the interelectrode voltage at the initiation of each pulse so that the interelectrode voltage after each pulse constantly increases until essentially the corona threshold value is reached. Thus, the interelectrode voltage is maintained at essentially the corona threshold voltage during the intervals between respective supply pulses to maintain the dust collection efficiency of the precipitator. The maintaining of the interelectrode voltage to essentially the corona threshold between supply pulses is achieved with a minimum of additional electrical components which have a minor power consumption so that the system of this invention can be supplied and operated at a reasonable cost from a commercial standpoint.

Accordingly, the object of this invention is to provide a pulse energization system for an electrostatic precipitator in which the interelectrode voltage at the end of each supply pulse is higher than the initial interelectrode voltage until such interelectrode voltage is essentially the voltage of the corona threshold.

These and other objects of this invention will be better understood upon consideration of the following detailed description of presently preferred embodiments thereof taken in conjunction with the following drawings, wherein.

Figure 1:
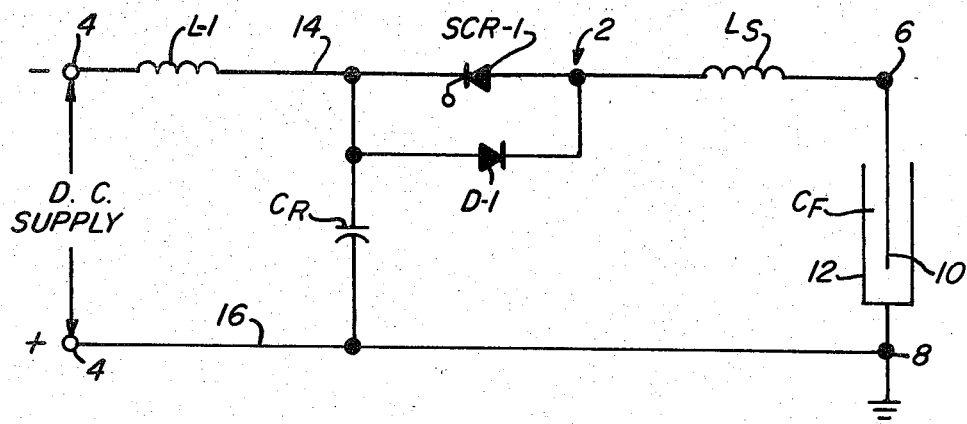
FIG. 1 is a schematic circuit diagram of a known pulse generator for the energization of an electrostatic precipitator.

A pulse generator control system 2 (FIG. 1) for an electrostatic precipitator is provided with suitable input terminals 4 for connection to a suitable known supply of DC power and suitable output terminals 6, 8 suitably connected to the discharge electrode 10 and the collecting plate 12, respectively, of a known type of electrostatic precipitator. As shown, the negative side of the DC power supply is connected via a conductor 14 to the terminal 6 with an inductance coil L-1, a thyristor SCR-1 and an inductance coil $L_S$ being respectively connected in series with each other and with coil L-1 being connected to the negative side of the DC supply. The positive side of the DC supply is connected via conductor 16 to the output terminal 8 and hence the collecting plate 12 and to ground. A capacitor $C_R$ is connected between conductors 14, 16 with the negative side connection being between L-1 and SCR-1. A diode D-1 is connected in parallel with SCR-1.

In operation, application of the DC supply voltage to the input terminals 4 causes the storage capacitor $C_R$ to be charged essentially to the full voltage of the DC supply. During the period between pulses the SCR-1 does not conduct because the gate signal required to initiate conduction is withheld by suitable timing circuitry (not shown) as is well known, and the diode D-1 does not conduct because it is reverse biased. For the purpose of energizing a precipitator effectively with pulses it is known that pulse duration is desired to be approximately from 50 to 200 microseconds, and the pulse repetition rate is expected to be in the range of 50 to 400 pulses per second. At maximum pulse duration and maximum pulse repetition rate the time interval from the end of one pulse to the start of the next is 2300 microseconds which is 11.5 times the pulse duration. The inductance value of coil L-1 is selected so that the amount of energy transferred from the DC supply to the storage capacitor $C_R$ during the generation of a pulse is negligible. Thus, the circuit, for purposes of analysis, can be considered as being disconnected from the DC supply for the duration of each pulse.

To initiate generation of a pulse, a gate signal of appropriate magnitude from the timing circuitry is applied to SCR-1, causing SCR-1 to become conductive and the voltage stored on capacitor $C_R$ appears instantaneously across the series combination of coil $L_S$ and the interelectrode capacitance of the electrodes 10, 12 which interelectrode capacitance is hereinafter referred to as $C_F$ as shown in the FIGS. Current will start to flow through coil $L_S$ to charge $C_F$, causing the voltage across $C_F$ to rise. The same current will discharge $C_R$, reducing its voltage, but as the capacitance of $C_R$ is substantially greater than the capacitance of $C_F$, the voltage rise across $C_F$ is much more rapid than the fall in voltage across $C_R$. The current through coil $L_S$ will continue to rise until the voltage across $C_F$ equals the voltage across $C_R$. Thereafter, the energy magnetically stored in coil $L_S$, due to the current flow through coil $L_S$, will maintain the current flow in the same direction as before, and $C_F$ will continue to be charged to voltages higher than the voltage on $C_R$. As this portion of the cycle continues the increasing voltage across $C_F$ will oppose the flow of current through the circuit and the current will finally fall to zero. At this point the instantaneous voltage across $C_F$ will approach twice the voltage across $C_R$ assuming no losses of energy in the circuit. At this time, since the current flow has dropped to zero, SCR-1 will become non-conductive. Since the voltage on $C_F$ exceeds that on $C_R$, current will now start to flow in the reverse direction through coil $L_S$ and the diode D-1, and the voltage on $C_F$ will fall at a high rate while the voltage on $C_R$ will rise at a lower rate due to the difference in capacitance between $C_F$ and $C_R$. Such reverse current will reach a maximum approximately when the $C_F$ and $C_R$ voltages are equal, and current flow will continue until $C_R$ and $C_F$ have returned approximately to the voltage levels at which conduction of SCR-1 was first initiated. The pulse cycle is now complete and nothing further occurs until SCR-1 is gated into conduction for the delivery of the next pulse, except that $C_R$ will be charged through coil L-1, replacing any loss of energy which occurred during the pulse cycle.

It will be noted that the duration of the pulse cycle is essentially determined by the length of one cycle of the resonant frequency of the inductance of coil $L_S$ interacting with the capacitance of the series combination of $C_R$ and $C_F$. In practice, since $C_F$ is determined by the construction of the precipitator to be energized, and since the capacitance of $C_R$ is proportioned to the capacitance $C_F$, pulse duration is established by suitable choice of the inductance value of coil $L_S$. Pulse repetition rate is determined by the interval between the application of gating signals by the timing circuitry to SCR-1.

The circuit of FIG. 1 applies voltage pulses to a precipitator, but does not provide for maintaining voltage on the precipitator during the interpulse interval. The precipitator voltage at the end of the pulse is theoretically at the voltage level which existed at the beginning of the pulse. In fact the precipitator voltage at the end of the pulse depends on the relative magnitude of energy losses in the various parts of the circuit and, particularly, losses in the precipitator. Such energy losses are, typically, heat losses resulting from current flow in the circuit or losses due to corona current flow. The end-of-pulse precipitator voltage can be higher, equal to, or lower than the start-of-pulse voltage; however, it is common for the termination voltage to be slightly higher than the initial voltage, but such higher voltage is not assured since precipitator operating conditions vary. Basically the magnitude of the corona losses determines whether the pulse will pump-up or pump-down the precipitator for a particular set of component values as used in the described circuit.

The pulse circuit of FIG. 1 will raise the interpulse voltage on the precipitator to the corona threshold value when the pulse termination voltage is higher than the pulse initiation voltage since, below corona threshold, the precipitator draws no discharge current and whatever voltage is impressed on it will remain nearly unchanged over the interval between pulses. A succession of pulses ending at voltages higher than starting will thus "pump-up" the precipitator voltage to the corona threshold value, but a subsequent rise above the corona threshold value will not occur because any voltage above the corona threshold value will be bled off by discharging the precipitator capacitance $C_F$, through interelectrode corona current. Positive means to produce the "pump-up" effect are necessary because the time during which the interpulse voltage is below the corona threshold value is an interval of reduced dust collection efficiency, and such intervals occur each time a sparkover is encountered in the precipitator, which sparkovers may occur quite frequently.

Figure 2:
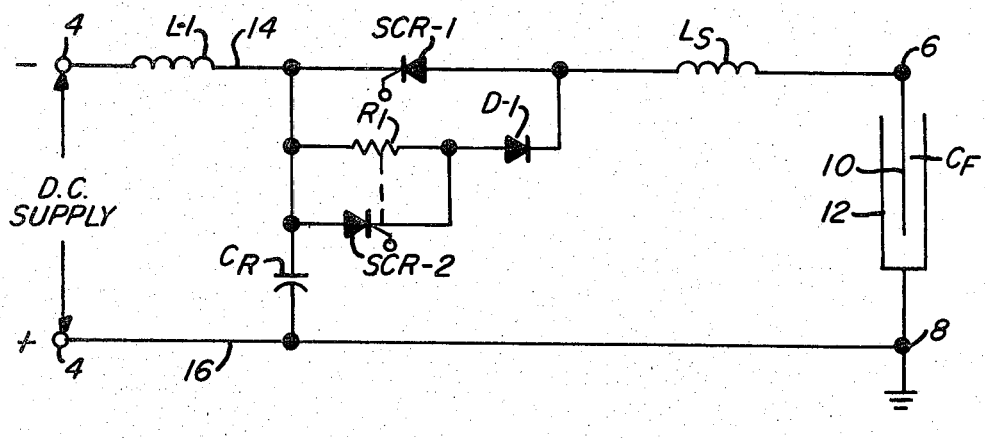
FIG. 2 is a schematic diagram of a pulse generator circuit for the energization of an electrostatic precipitator in accordance with the principles of this invention.

FIG. 2, in which like components have been identified by the same reference numbers, shows a modification of the circuit of FIG. 1 in which additional electrical components are provided in the circuit of FIG. 1 to insure that the desired "pump-up" effect is obtained. One end of a resistor $R_1$ is connected to the negative side of capacitor $C_R$ and the other end thereof is connected to the anode side of the diode D-1. A thyristor SCR-2 is also connected to the negative side of capacitor $C_R$ and is parallel with $R_1$ so that when gated by a suitable known timing circuit (not shown) a reverse current flow from the precipitator will occur to charge capacitor $C_R$. More specifically, assuming that SCR-2 is not gated into conduction, return of energy from precipitator capacitance $C_F$ to storage capacitor $C_R$ on the falling half of the voltage pulse applied to $C_F$ will be reduced by the voltage drop across $R_1$ due to current flowing through it, the resulting magnetic energy stored in coil $L_S$ during this portion of the cycle will be less than for the circuit of FIG. 1, and the pulse voltage on $C_F$ will terminate at a higher voltage than that at which it started. The voltage on the precipitator will be pumped up by successive pulses until it reaches the corona threshold value, after which interelectrode corona current discharging the capacitance internally of the precipitator will prevent further buildup of the interelectrode voltage existing between pulses. The rate of pump-up is determined by the value of resistance chosen for $R_1$. The continuous dissipation of energy in $R_1$ after pump-up to the corona threshold voltage has occurred may be undesirable, and SCR-2 is therefore added. Gating SCR-2 into conduction short-circuits $R_1$ and reduces the pump-up effect to that resulting from the natural behavior of the circuit as described with relation to FIG. 1. It may, on occasion, be desirable to retain some slight flow of corona current in the precipitator between pulses but simultaneously to reduce the power loss in $R_1$ when the full pump-up effect is not required, and for this purpose SCR-2, or an additional thyristor SCR, is connected to short out a portion of $R_1$ when gated into conduction, as indicated by the dotted connection in FIG. 2.

Figure 3:
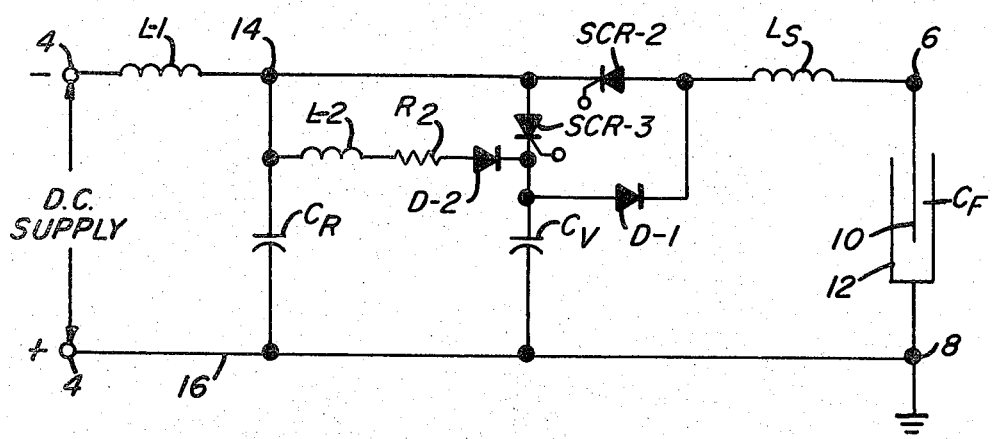
FIG. 3 is another schematic diagram of a pulse generator circuit for the energization of an electrostatic precipitator in accordance with the principles of this invention.

FIG. 3 illustrates another circuit of this invention in which the power loss in the resistor $R_1$ of FIG. 2 is eliminated. Components which are identical to those previously described have been identified by the same reference numerals. As shown a thyristor SCR-3 has its anode connected to conductor 14 intermediate coil L-1 and SCR-1 and its cathode connected to one side of capacitor $C_V$ with the other side of $C_V$ being connected to ground conductor 16. The anode of diode D-1 is connected between SCR-3 and $C_V$. A voltage discharge circuit for $C_V$ is provided comprising an inductance coil L-2 connected in series with a resistor $R_2$ which in turn is connected in series with the anode of a diode D-2. The inductance coil L-2 is connected to conductor 14 intermediate coil L-1 and SCR-1 and the cathode of D-2 is connected intermediate SCR-3 and $C_V$. SCR-3 is gated into conduction by a suitable timing circuit as is well known.

Assuming SCR-2 is not conducting, the impedance values of inductance L-2 and resistance $R_2$ are selected so that there is no significant current flow through L-2, $R_2$ and diode D-2 throughout the duration of a pulse. With the circuit of FIG. 3 the rising voltage pulse between the electrodes 10, 12 is generated in the same manner as previously described; however, during the falling voltage portion of the pulse cycle the energy from $C_F$ is transferred through inductance $L_S$ into capacitor $C_V$ instead of the storage capacitor $C_R$ as in the circuits previously described. The capacitance of $C_V$ is smaller than the capacitance of $C_R$ and accordingly the voltage rises more quickly on $C_V$ than if $C_R$ were being charged. As a result, the transfer of energy is terminated sooner than as previously described and the voltage on $C_F$ remains at a higher value than the voltage existing on $C_R$ at the initiation of the pulse. Thus, the pumping up of the voltage on $C_F$ will occur at a rate determined by the capacitance of $C_V$ relative to the capacitance of $C_R$ and the capacitance of $C_F$. The rate at which the voltage drops on $C_F$ is higher than the rate of drop previously described with relation to FIG. 1 whereby the pulse duration will be shorter. The pulse duration can be varied by the value of the inductance coil $L_S$ and, accordingly, $L_S$ is of a value to maintain the desired pulse duration. Alternatively an additional inductance can be connected in series with diode D-1 to also control the pulse duration.

To return the voltage level on $C_V$ to approximately that on $C_R$ at the start of the pulse, diode D-2, resistor $R_1$ and coil L-2 are provided. Coil L-2 and resistor $R_1$ are chosen to permit transfer of most of the excess voltage of $C_V$ over $C_R$ to $C_R$ during the interpulse interval. The relatively long time constant thus derived will allow $C_V$ to behave essentially as though the diode D-2, $R_1$, L-2 circuit did not exist during the pulse cycle. Note that any excess of voltage residing on $C_V$ as compared to $C_R$ at the start of the pulse will act to further inhibit transfer of energy from $C_F$ during the latter half of the pulse cycle, thereby further enhancing the pump-up effect.

SCR-2, when gated into conduction, connects $C_V$ in parallel with $C_R$ so that they act as one in pulse generation, and the operation then becomes the same as that of FIG. 1; that is, pump-up reverts to the level, if any, established by the balance of losses in the circuit.

One of the characteristics of precipitators is that sparkover from the discharge electrode 10 to ground (i.e., electrode 12) occurs periodically in normal operation. This has certain implications with respect to energization by a pulse generator of the type described herein. Assume that it is desired to apply a pulse with a peak value of 60 kv to a precipitator having a corona threshold voltage of 20 kv. In such event the DC supply voltage to the pulse generator would be adjusted to about 40 kv, since the pulse height, described for the circuit of FIG. 1 as being about twice the voltage of the storage capacitor $C_R$, is about twice the difference between the voltage on the storage capacitor $C_R$ and the corona threshold voltage on the precipitator. When a spark occurs in the precipitator between the electrodes 10, 12 the precipitator voltage will be reduced essentially to zero. If the DC supply voltage remains unchanged, and if the storage capacitor $C_R$ is nearly fully recharged before the next pulse starts, the higher voltage difference now existing in the circuit will cause the next pulse to approach a peak value of 80 kv, which will result in a second sparkover of the precipitator, and such sparkovers will repeat continuously. Successive sparkovers are undesirable, and it is necessary to provide for prevention of such sparkovers.

Ordinarily, sparkover of the precipitator will occur when SCR-1 is conducting and will tend to partially or completely discharge the storage capacitor $C_R$. Preferably the supply inductance L-1 and the rate of rise of the voltage on the storage capacitor $C_R$ after a spark, is made to match the rate at which the precipitator voltage is pumped up to corona threshold interpulse voltage whereby generation of overvoltage pulses is avoided. Choice of relatively small capacitance values for the storage capacitor $C_R$, with relatively large inductances for L-1, and on occasion with resistance inserted in series with coil L-1, will help to accomplish the desired result. Where these measures are insufficient, such as when the precipitator sparkover does not sufficiently discharge the storage capacitor $C_R$, momentary reduction or interruption of the DC supply voltage can be utilized. An adjustable DC supply voltage is ordinarily obtained through gating devices, such as thyristors having a response which occurs within one-half cycle of the supply line frequency. Three alternate modes of operation may be used. One, detection of a precipitator sparkover by well-known means which develops a signal which momentarily inhibits conduction of the DC supply control devices, thus dropping the DC supply voltage and then permitting voltage to build up on the storage capacitor $C_R$ at a rate controlled primarily by the L-1 - $C_R$ time constant and secondarily by the programmed rate of recovery of the DC supply voltage. Two, a signal proportional to the difference between the precipitator interpulse voltage and the storage capacitor voltage to control the DC supply voltage and hold said difference relatively constant. Three, a signal proportional to the precipitator interpulse voltage is subtracted from a constant value proportional to the desired peak precipitator voltage, and the DC supply voltage is controlled to a value proportional to said difference, such that the DC supply voltage is changed in amounts approximating one-half the amounts by which the precipitator interpulse voltage changes. All the above may be accomplished by combinations of well-known electrical measurement and control circuits.

All of the preceding circuits described have been in terms of application to precipitators energized by negative polarity voltages and pulses. References to higher and lower voltages in such description mean more highly negative or less highly negative. The same theories and equipment with suitable reversals of supply and component polarity are applicable to cases where positive polarity energization may be desired. Also, the prior description has referred to single-stage two-electrode precipitators; however, the methods and apparatus of this invention are equally applicable to single-stage precipitator structures having three, or more, electrodes, or other structures of the two-stage type. References to connection to, or energization of, a precipitator herein include one or more electrode sets in precipitators having multiple independent sets of such electrodes. It is also to be understood that a single DC supply may energize one or more pulse generator units.

Also, by simple rearrangement of components so that the half of the pulse cycle which charges $C_F$ is inhibited and that which discharges $C_R$ is enhanced, such rearranged components will generate a pulse terminating at a lower voltage than that at which it was initiated, and establish a "pump-down" condition. While not of interest in powering electrostatic precipitators as here described, there may be application with pulse generators feeding other types of capacitive loads.

Although presently preferred embodiments of this invention have been described and modifications thereto, it is to be realized that still other modifications may be made thereto by one skilled in the relevant art. Accordingly, the scope of this invention, recognizing that modifications may be made thereto, is defined in the following claims.

What is claimed is:

1. A control circuit comprising: a pair of spaced electrical conductors having a power input portion adapted to be connected to a direct current supply; said conductors being connected to spaced electrodes, respectively, capable of maintaining a capacitive charge therebetween; a capacitor electrically connected across said conductors in parallel with said electrodes; means electrically connected with respect to one of said conductors, for discharging said capacitor at selected spaced time intervals to produce sequential voltage pulses between said electrodes with each pulse producing a maximum voltage between said electrodes which is higher than the voltage existing across said capacitor at the initiation of the respective discharge thereof, for determining the duration of each of said pulses, and for effectively electrically isolating said capacitor from said input portion throughout the duration of each of said pulses; said means being electrically effective to discharge said capacitor only throughout that portion of each of said pulses during which the voltage between said electrodes is increasing; additional means electrically connected with respect to said one conductor and said capacitor for sequentially recharging said capacitor by the charge existing between said electrodes after each of said pulses has achieved said maximum voltage; and said additional means including an electrical impedance to maintain the voltage between said electrodes at the conclusion of each of said pulses at a voltage of a different magnitude than the voltage existing between said electrodes at the initiation of the respective ones of said pulses with said magnitude always increasing in the same manner until a selected voltage exists between said electrodes.

2. A control circuit as set forth in claim 1 wherein said selected voltage is essentially the corona threshold value.

3. An electrostatic precipitator circuit comprising: a pair of spaced electrical conductors having a power input portion adapted to be connected to a direct current supply; said conductors being connected to the discharge and collecting electrodes, respectively, of an electrostatic precipitator; a capacitor electrically connected across said conductors in parallel with said electrodes; means electrically connected with respect to one of said conductors, for discharging said capacitor at selected spaced time intervals to produce sequential voltage pulses between said electrodes with each pulse producing a maximum voltage between said electrodes which is higher than the voltage existing across said capacitor at the initiation of the respective discharge thereof, for determining the duration of each of said pulses, and for effectively electrically isolating said capacitor from said input portion throughout the duration of each of said pulses; said means being electrically effective to discharge said capacitor only throughout that portion of each of said pulses during which the voltage between said electrodes is increasing; additional means electrically connected with respect to said one conductor and said capacitor for sequentially recharging said capacitor by the charge existing between said electrodes after each of said pulses has achieved said maximum voltage; and said additional means including an electrical impedance to maintain the voltage between said electrodes at the conclusion of each of said pulses at a higher voltage than the voltage existing between said electrodes at the initiation of the respective ones of said pulses until said higher voltage is of a selected value.

4. A circuit as set forth in claim 3 wherein said selected value is essentially the corona threshold value.

5. A circuit as set forth in claim 3 wherein said electrical impedance includes a resistive impedance.

6. A circuit as set forth in claim 3 wherein said electrical impedance includes resistive and inductive impedances.

7. A circuit as set forth in claim 5 wherein means are cooperable with said resistive impedance to vary the impedance thereof.

8. A circuit as set forth in claim 3 wherein means are cooperable with said impedance to selectively vary the impedance value thereof.

9. A circuit as set forth in claim 3 wherein said additional means includes a capacitor having a lower capacitance value than said first mentioned capacitor.

10. A circuit as specified in claim 3 wherein said supply is a known type in which after sparkover the supply voltage is reduced and then increased to the desired operating value and wherein said means controls the supply voltage proportional to the difference between said capacitor voltage and the voltage between said electrodes.

11. A circuit as specified in claim 3 wherein said supply is a known type in which after sparkover the supply voltage is reduced and then increased to the desired operating value and wherein said means controls the supply voltage proportional to the difference between the precipitator interpulse voltage and the desired peak voltage.

12. A method of establishing a selected voltage gradient between the electrodes of a direct current electrostatic precipitator comprising: charging a capacitor selectively connectable in parallel to the electrodes of an electrostatic precipitator from a direct current source until a selected voltage exists across said capacitor and with said capacitor being electrically isolated from said electrodes; discharging said capacitor over a controlled period of time to produce a higher voltage between said electrodes than existed across said capacitor at the initiation of said discharge while effectively electrically isolating said capacitor from said source; recharging said capacitor at a controlled rate immediately subsequent to said discharging by the charge existing between said electrodes while maintaining said effective isolation with the resultant voltage between said electrodes being higher than the voltage therebetween prior to said discharging; selectively additionally recharging said capacitor from said source after said first mentioned recharging with said capacitor being electrically isolated from said electrodes; and repeating said discharging, said recharging, and said additional recharging until the voltage between said electrodes is at a preselected magnitude.

* * * * *